United States Patent
Kailas et al.

(10) Patent No.: US 7,836,256 B2
(45) Date of Patent: Nov. 16, 2010

(54) METHOD AND APPARATUS FOR APPLICATION-SPECIFIC DYNAMIC CACHE PLACEMENT

(75) Inventors: Krishnan Kunjunny Kailas, Tarrytown, NY (US); Rajiv Alazhath Ravindran, Ann Arbor, MI (US); Zehra Sura, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 31 days.

(21) Appl. No.: 12/165,178

(22) Filed: Jun. 30, 2008

(65) Prior Publication Data

US 2008/0270705 A1    Oct. 30, 2008

Related U.S. Application Data

(63) Continuation of application No. 11/482,923, filed on Jul. 7, 2006, now abandoned.

(51) Int. Cl.
*G06F 12/00* (2006.01)
(52) U.S. Cl. ............... 711/129; 711/118; 711/128; 711/E12.041
(58) Field of Classification Search ............... 711/129
See application file for complete search history.

(56) References Cited

U.S. PATENT DOCUMENTS 7,451,272 B2 *   11/2008   Woffinden et al. .......... 711/118
2005/0240733 A1 *   10/2005   Luick .......................... 711/137

* cited by examiner

*Primary Examiner*—Reginald G Bragdon
*Assistant Examiner*—Thanh D Vo (57) ABSTRACT

One embodiment of the present method and apparatus for application-specific dynamic cache placement includes grouping sets of data in a cache memory system into two or more virtual partitions and processing a load/store instruction in accordance with the virtual partitions, where the load/store instruction specifies at least one of the virtual partitions to which the load/store instruction is assigned.

16 Claims, 6 Drawing Sheets

METHOD AND APPARATUS FOR APPLICATION-SPECIFIC DYNAMIC CACHE PLACEMENT

CROSS REFERENCE TO RELATED APPLICATIONS

This application is a continuation of U.S. patent application Ser. No. 11/482,923, filed Jul. 7, 2006, now abandoned entitled "METHOD AND APPARATUS FOR APPLICATION-SPECIFIC DYNAMIC CACHE PLACEMENT", which is herein incorporated by reference in its entirety.

FIELD OF THE INVENTION

The present invention relates generally to data processing systems and relates more particularly to the management of data stored in cache memory systems.

BACKGROUND

The performance gap between the processor and the memory system in computing systems has been steadily increasing. With every generation, processors are being clocked at higher rates, while memory systems have been unable to catch up to this exponential growth. The resultant performance gap has caused a major bottleneck for single-thread performance in modern day processors, as the memory system is generally unable to supply data to the processor core at the rate of execution of the processor.

Traditional means of reducing this performance gap include the use of cache memory of varying sizes and levels, which provides temporary storage for and quick access to frequently used data. Cache memory is conventionally managed by hardware, which attempts to cache the most frequently accessed data while purging older, unused data and fetching data from nearby memory locations, thus retaining the working set of the program in cache.

Although there are many advantages to using hardware-managed cache systems, such as transparency and flexibility, the layer of abstraction afforded by these systems comes at a price. For one, because hardware-managed cache is designed to support a wide spectrum of workloads, the design tends to be very generic in terms of the algorithms used for cache placement (i.e., determining where in the cache array to keep a data item fetched from a specific memory address). For example, set placement decisions are made based on selected bits from the physical address to index into a given set of a set-associative cache. Although such greedy/random replacement decisions provide reasonably high hit-rates at low cost, they have proven to be ineffective for high memory bound workloads. Thus hardware-managed cache is generally less capable of exploiting application-specific behaviors and replacement policies than other memory schemes. Other software-based approaches that rely on the programmer or compiler for data movement also tend to behave too conservatively to close the processor/memory system gap effectively.

Thus, there is a need in the art for a method and apparatus for application-specific dynamic cache placement.

SUMMARY OF THE INVENTION

One embodiment of the present method and apparatus for application-specific dynamic cache placement includes grouping sets of data in a cache memory system into two or more virtual partitions and processing a load/store instruction in accordance with the virtual partitions, where the load/store instruction specifies at least one of the virtual partitions to which the load/store instruction is assigned.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for application-specific dynamic cache placement. In one embodiment, the present invention maintains multiple smaller caches, as opposed to the traditional unified cache. That is, the cache is partitioned logically (i.e., without necessarily maintaining multiple distinct caches), such that data items can be assigned separately to each of the partitions, thereby reducing conflicts among data items that may share a set address while residing at different locations within memory. Moreover, data sets with long reuse can be restricted to a certain partition, making it less likely that a data set will replace other, more useful data items assigned to other partitions.

Figure 1:
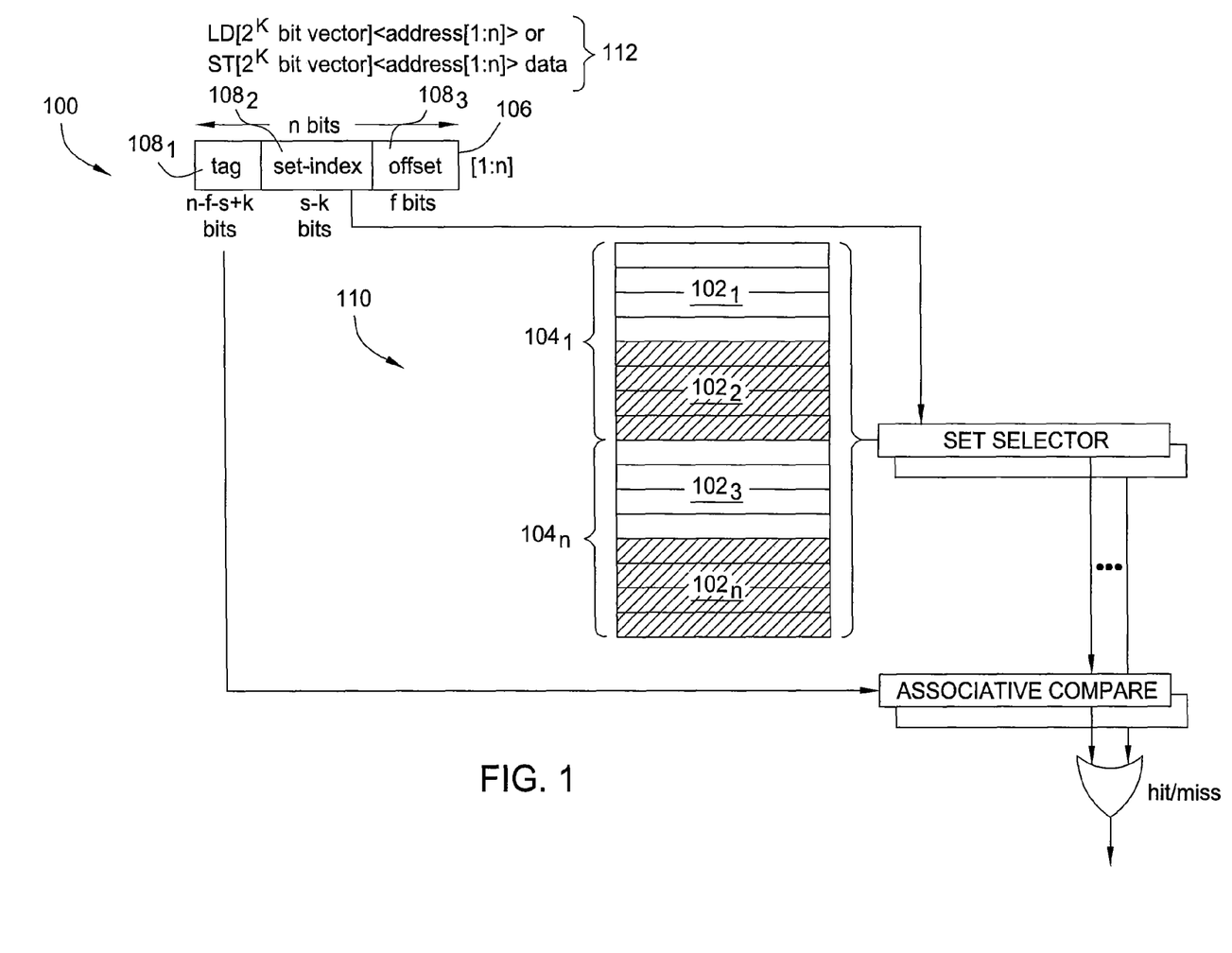
FIG. 1 is a schematic diagram illustrating an exemplary cache, partitioned according to one embodiment of the present invention.

FIG. 1 is a schematic diagram illustrating an exemplary cache 100, partitioned according to one embodiment of the present invention. A tag directory/array 110 of the cache 100 comprises a plurality of sets $102_1$-$102_n$ (hereinafter collectively referred to as "sets 102"). Each set 102 comprises a plurality of ways or lines to which data items may be loaded. The sets 102 are grouped into two or more partitions $104_1$-$104_n$ (hereinafter collectively referred to as "partitions 104"). The partitions 104 are virtual groupings or "supersets" comprising multiple regular sets 102. In the example of FIG. 1, the tag directory 110 comprises four sets 102 (each comprising 4 lines) that are grouped into two partitions 104 of two sets 102 each.

An exemplary load/store instruction 112 for accessing the cache 100 generates an n-bit address 106, where the fields $108_1$-$108_3$ (hereinafter collectively referred to as "fields 108") of the address are named using the convention address [n:m], n is the least significant bit and m is the most significant bit. The width, w, of a field 108 is therefore m−n+1. For unified cache, s bits of the n-bit address are used to select among $2^s$ sets in cache; for partitioned cache comprising $2^k$ partitions, only s−k bits are used to select sets within a given partition 104.

The address 106 specified by the load/store instruction 112 comprises a "tag" field $108_1$ for specifying a tag address of referenced data item stored in the tag directory 110, a "set-index" field $108_2$ for specifying a maximum number of sets 102 per partitions 104 in the cache 100, and an "offset" field $108_3$ for specifying a size of the data item. As will be described in further detail below, the load/store instruction 112 also specifies one or more identifiers of target partitions 104 in the cache 100. The target partitions 104 comprise portions of the cache 100 to which the load/store instruction 112 may load a data item in the event that the data item is not already contained within the cache 100. In general, if there are $2^k$ partitions 104 in the cache 100, the partition 104 to which the load/store instruction 112 is assigned is represented using a $2^k$-bit vector, where each bit in the $2^k$-bit vector corresponds to a given partition 104. Thus, for example, if there are four partitions in cache, and a load/store instruction is assigned to partitions two and three, the corresponding bit-vector value would be [0110], where 0 indicates an unassigned partition and 1 indicates an assigned partition.

Figure 2:
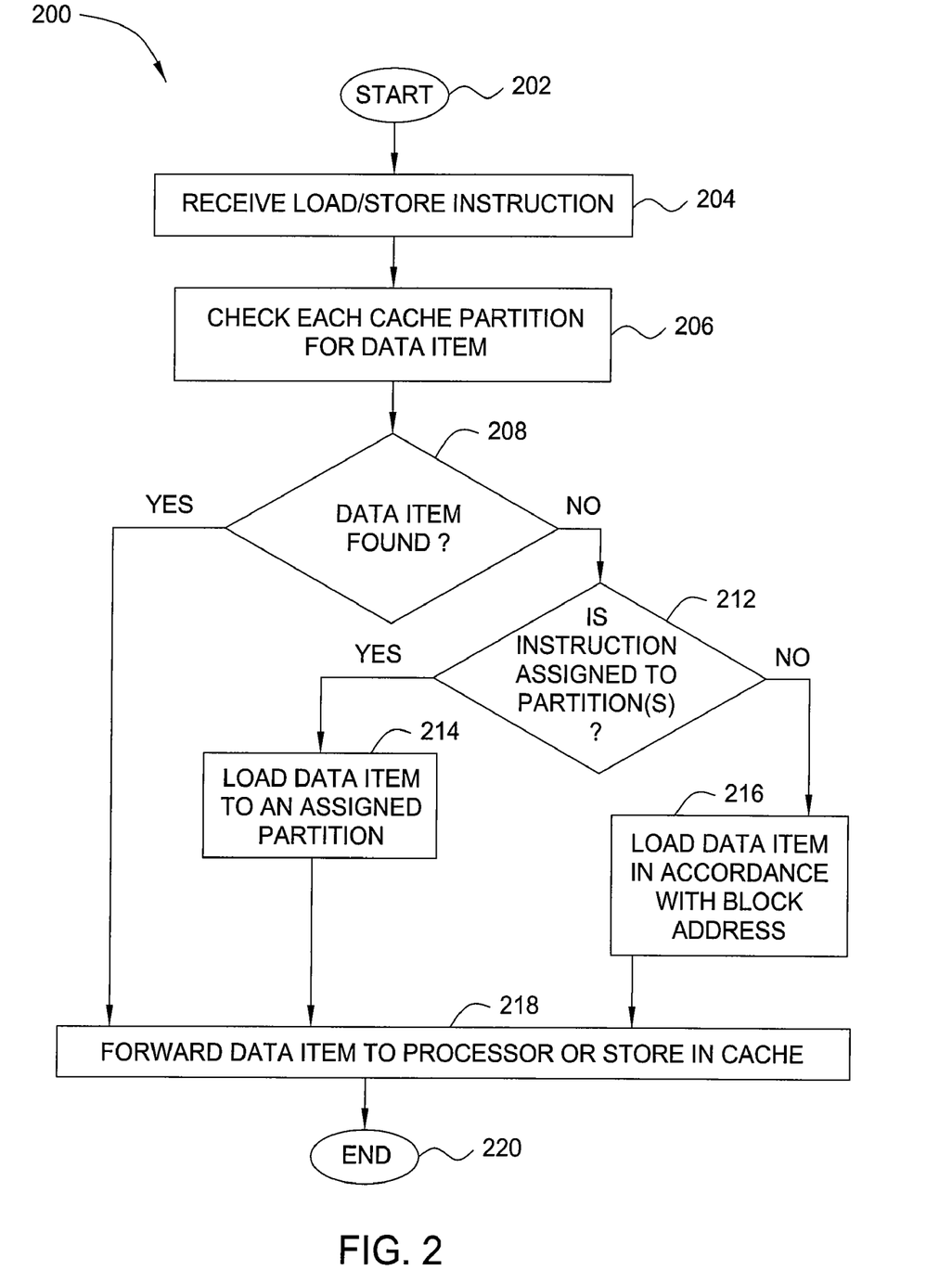
FIG. 2 is a flow diagram illustrating one embodiment of a method for loading and storing data, according to the present invention.

FIG. 2 is a flow diagram illustrating one embodiment of a method 200 for loading and storing data, according to the present invention. The method 200 may be implemented, for example, at a cache controller.

The method 200 is initialized at step 202 and proceeds to step 204, where the method 200 receives a load/store instruction. The method 200 then proceeds to step 206 and checks each partition in the cache for the data item referenced in the load/store instruction. Referring back to FIG. 1, in step 206, the method 200 looks for the "tag" field 108 (i.e., tag field $108_1$) of the address of (i.e., the bits [f+s−k:n] of the address) in the tag directory 110 in each partition 104. In another embodiment, the method 200 only examines specific partitions of the cache that are specified using the bit-vector in the load/store instruction generated by the compiler.

In step 208, the method 200 determines whether the data item is present in the cache based on the result of the tag comparison done in step 206. If the method 200 concludes in step 208 that the data item is present in a given partition in the cache (i.e., a cache "hit"), the method 200 proceeds to step 218 and either forwards the data item to the processor (in the case of a load operation) or stores the data item in cache (in the case of a store operation).

Alternatively, if the method 200 concludes in step 208 that the data item is not present in the cache (i.e., a cache "miss"), the method 200 proceeds to step 212 and determines whether the load/store instruction is assigned to one or more partitions of the cache.

If the method 200 concludes in step 212 that the load/store instruction is assigned to a partition, the method 200 proceeds to step 214 and loads the data item to one of the partitions assigned to the load/store instruction (e.g., to tag directory location (p, set-index), where p is a selected partition in the tag directory). In this case, a partition identifier that specifies a partition of cache to which the load/store instruction has been assigned is included in the load/store instruction. In one embodiment, where the partition identifier specifies more than one partition, any replacement policy (e.g., least recently used or the like) may be used to select from among the specified partitions.

In one embodiment, the partition identifier is implemented as part of a special load/store instruction that includes a number of extra bits for identifying the partition. In another embodiment, the partition identifier is implemented as a separate prefix instruction that specifies the partition associated with the next sequential load/store instruction. In another embodiment still, one or more special registers can be implemented as new additional operands of load/store instructions to specify the partition information. The register-based solution allows the load or store to be assigned to multiple partitions, as each register will comprise a bit-vector that specifies the assigned partitions. In one embodiment, register move instructions are used to initialize each register with a literal that corresponds to the partition bit-vector. The register move instructions are inserted prior to the load/store instructions that use them. In yet another embodiment involving a small number of partitions, such a bit-vector is specified as an immediate operand of the load/store instruction.

Alternatively, if the method 200 concludes in step 212 that the load/store instruction is not assigned to a partition, the method 200 proceeds to step 216 and loads the data item in accordance with the address of the data item (i.e., in accordance with the treatment of traditional unified cache).

Once the data item has been fetched from the cache (i.e., in accordance with step 210) or loaded to the appropriate partition (i.e., in accordance with step 214 or 216), the method 200 proceeds to step 218 and either forwards the data item to the processor (load) or stores the data item in cache (store) before terminating in step 220. For a load instruction, the data item is read from the tag directory of the cache location (p, set-index, tag) at offset, where p is the partition identifier. Similarly, for a store instruction, the data item is written at offset in tag directory location (p, set-index, tag).

Thus, according to the method 200, the knowledge of which sets in cache comprise which partitions is encoded in the cache controller. This knowledge is substantially transparent to an application using the cache, however. By searching for the referenced data item in all cache partitions to determine a hit or a miss, occurrences of data duplication and associated coherency issues are substantially reduced. By annotating load/store instructions with partition identifiers that are to be searched during this stage, performance may be even further improved. If a compiler is unable to prove that two loads assigned to two different partitions do not conflict, the compiler may allow both loads to probe each others' partitions, thereby reducing the occurrence of data duplication.

Moreover, by allowing a load/store instruction to load data only to assigned partitions of the cache, the likelihood of the load/store instruction replacing data items required by other load/store instructions is substantially reduced. "Unified" and "partitioned" views of the cache can be retained simultaneously, without having to re-organize the tag directory of the cache.

Figure 3:
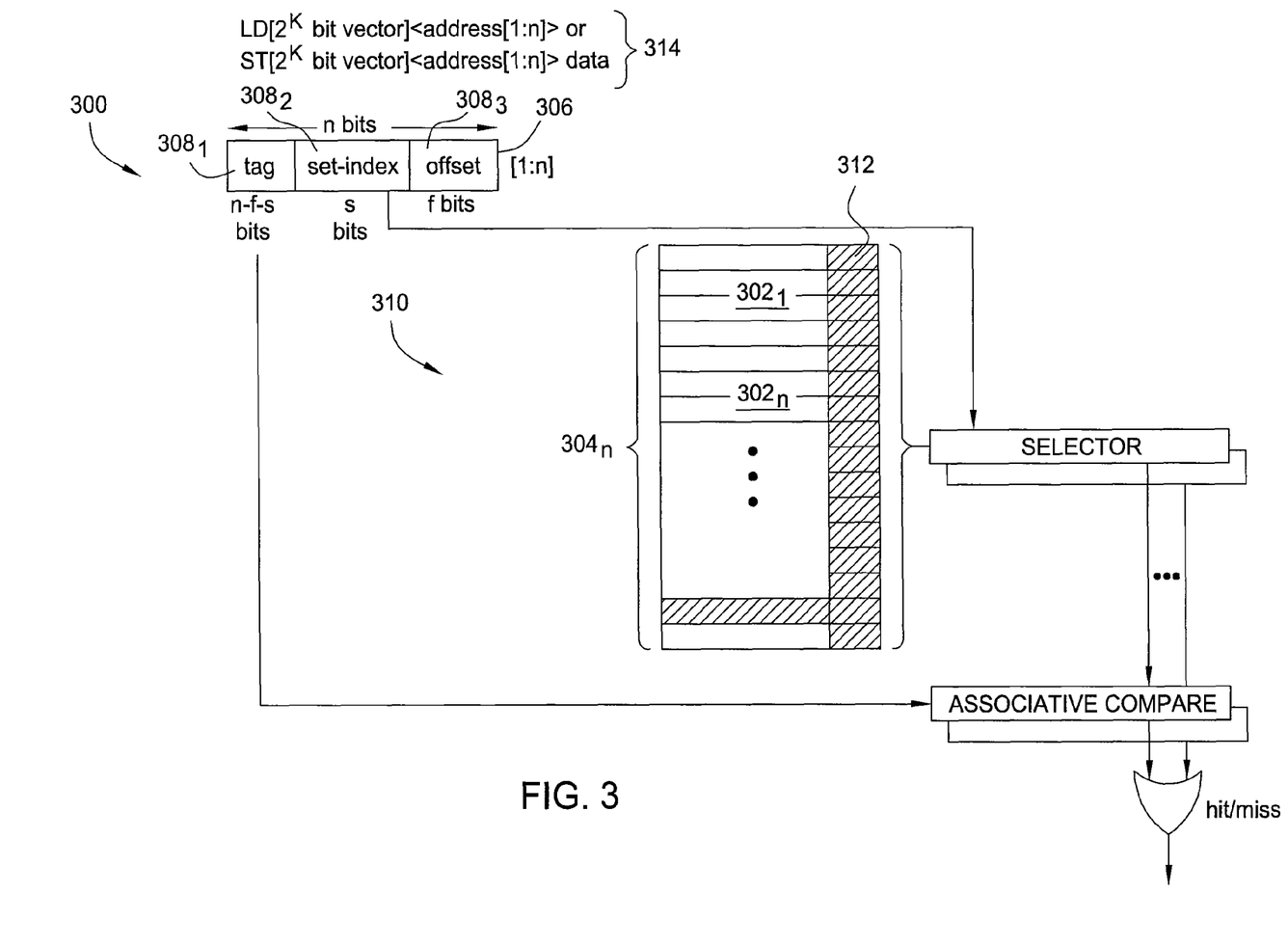
FIG. 3 is a schematic diagram illustrating an exemplary cache, partitioned according to another embodiment of present invention.

FIG. 3 is a schematic diagram illustrating an exemplary cache 300, partitioned according to another embodiment of present invention. The cache 300 is substantially similar to the cache 100 illustrated in FIG. 1. A tag directory/array 310 of the cache 300 comprises a plurality of sets $302_1$-$302_n$ (hereinafter collectively referred to as "sets 302"). Each set 302 comprises a plurality of ways or lines to which data items may be loaded. The sets 302 are grouped into two or more partitions $304_n$ (hereinafter collectively referred to as "partitions 304"). In the example of FIG. 3, the tag directory 310 comprises two sets 302 (each comprising 4 lines) that are grouped into a single partition 304. Unlike the cache 100, the cache directory 310 includes an additional partition identifier 312 for each set 302 in the cache 300. Thus, a partition 304 comprises all sets 302 that have the same partition identifier 312.

The address 306 specified by the exemplary load/store instruction 314 is substantially similar to that for a unified cache and comprises a "tag" field $308_1$ for specifying a referenced data item, a "set-index" field $308_2$ for specifying a maximum number of partitions 304 in the cache 300, and an "offset" field $308_3$ for specifying a block size of the data item. The load/store instruction 314 also specifies one or more identifiers of target partitions 304 in the cache 300.

Figure 4:
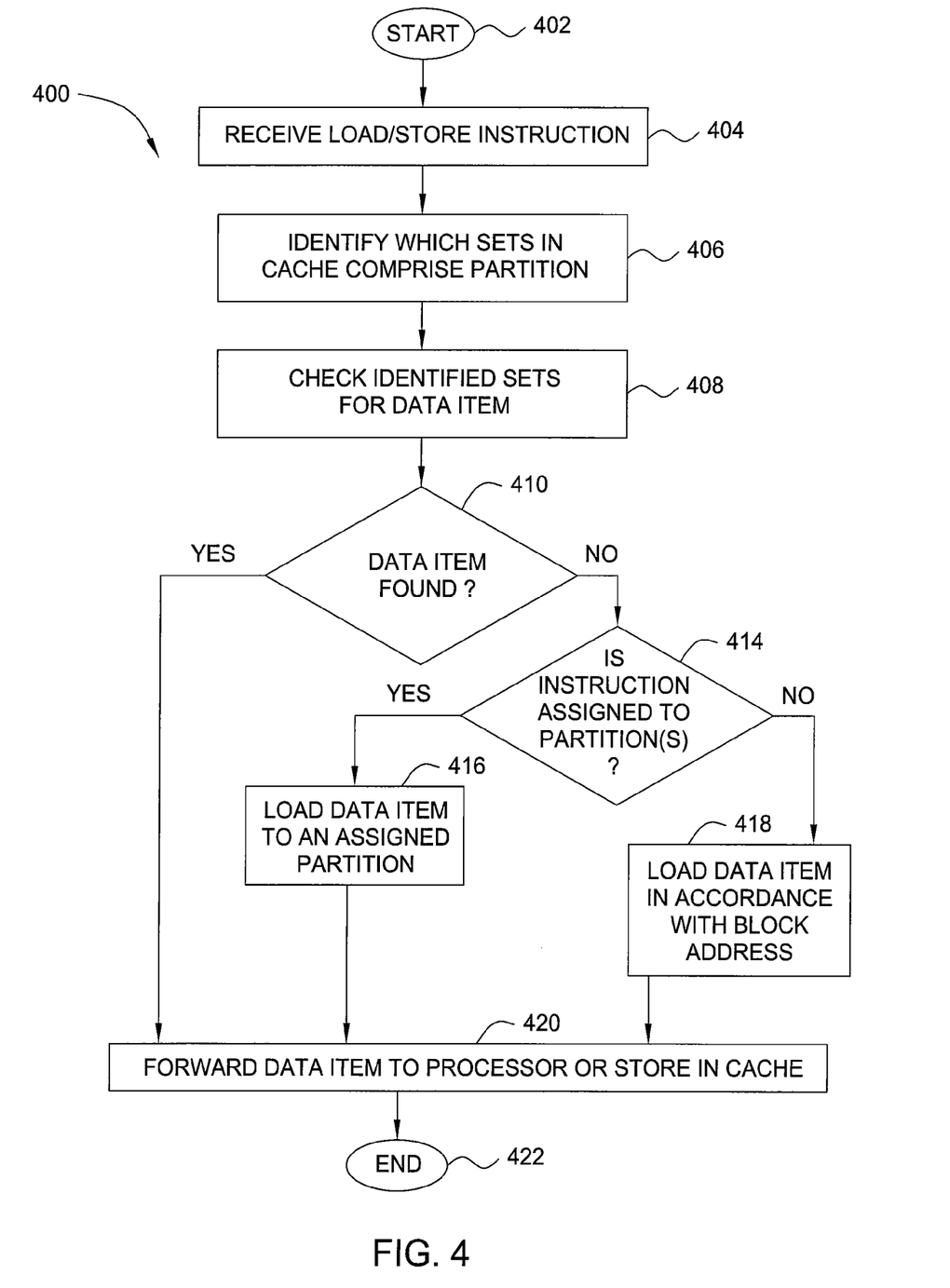
FIG. 4 is a flow diagram illustrating another embodiment of a method for loading and storing data, according to the present invention.

FIG. 4 is a flow diagram illustrating another embodiment of a method 400 for loading and storing data, according to the present invention. The method 400, like the method 200, may be implemented at a cache controller. Unlike the method 400, however, the method 400 implements partition identifiers as part of the cache tag directory structure, as described with respect to FIG. 3.

The method 400 is initialized at step 402 and proceeds to step 404, where the method 400 receives a load/store instruction. The method 400 then proceeds to step 406 and identifies which sets within the cache comprise a partition. In particular, since the partition identifiers for each set are stored in the tag directory structure, the method 400 first probes the tag directory to identify which sets constitute a partition. This must be done for all sets, so as to identify every partition.

Once the method 400 has identified the sets within each partition, the method 400 proceeds to step 408 and checks each identified partition in the cache for the data item referenced in the load/store instruction. The sets in a partition are probed using regular "tag" and "set-index" fields from the load/store instruction.

In step 410, the method 400 determines whether the data item is present in a given partition in the cache. If the method 400 concludes in step 410 that the data item is present in the cache (i.e., a cache "hit"), the method 400 proceeds to step 420 and either forwards the data item to the processor (load) or stores the data item in the cache (store).

Alternatively, if the method 400 concludes in step 410 that the data item is not present in the cache (i.e., a cache "miss"), the method 400 proceeds to step 414 and determines whether the load/store instruction is assigned to one or more partitions of the cache.

If the method 400 concludes in step 414 that the load/store instruction is assigned to a partition, the method 400 proceeds to step 416 and loads the data item to one of the partitions assigned to the load/store instruction (e.g., to tag directory location (p, set-index), where p is a selected partition in the tag directory). In this case, a partition identifier that specifies a partition of cache to which the load/store instruction has been assigned is included in the load/store instruction. In one embodiment, where the partition identifier specifies more than one partition, any replacement policy (e.g., least recently used or the like) may be used to selected from among the specified partitions.

Alternatively, if the method 400 concludes in step 414 that the load/store instruction is not assigned to a partition, the method 400 proceeds to step 418 and loads the data item in accordance with the address of the block/data item (i.e., in accordance with the treatment of traditional unified cache).

Once the data item has been fetched from the cache or loaded to the appropriate partition (i.e., in accordance with step 416 or 418), the method 400 proceeds to step 420 and forwards the data item to the processor or stores the data item in the cache before terminating in step 422. For a load instruction, the data item is read from the tag directory of the cache location (p, set-index, tag) at offset, where p is the partition identifier. For a store instruction, the data item is written at offset in tag directory location (p, set-index, tag).

The method 400, though similar to the method 200, does not fix the number of partitions (or the sizes of the partitions) in cache. Thus, the method 400 can accommodate cache accesses by different applications having different needs regarding partition configuration. Also, even within an application, different phases of the application having different partition requirements can be easily accommodated. Thus, the method 400 affords more flexibility than the method 200, but at the cost of slightly greater overhead (required to maintain partition identifiers within the tag directory of the cache).

Figure 5:
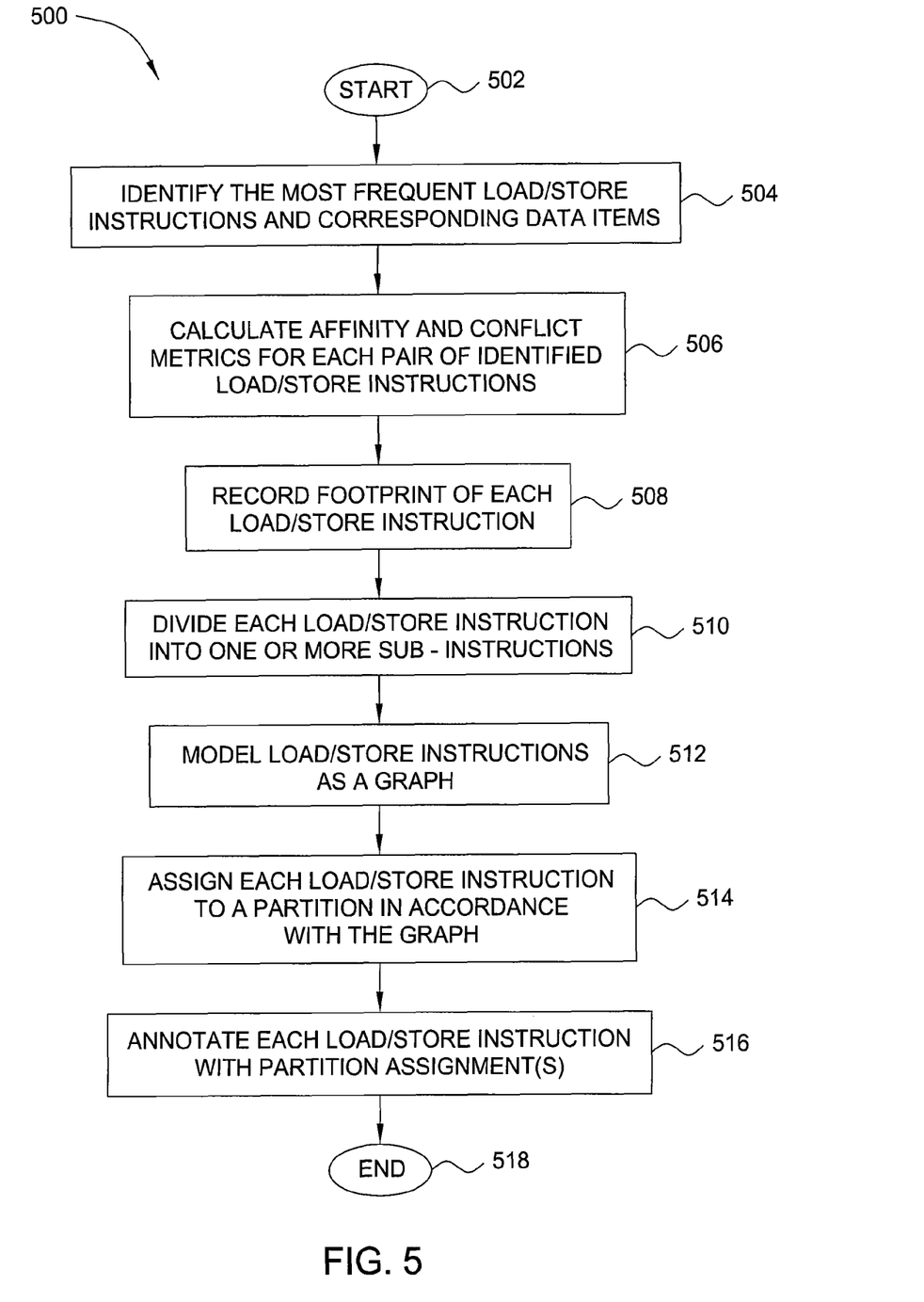
FIG. 5 is a flow diagram illustrating one embodiment of a method for partitioning load/store instructions, according to the present invention.

FIG. 5 is a flow diagram illustrating one embodiment of a method 500 for partitioning load/store instructions, according to the present invention. The method 500 may be implemented, for example, at a compiler, in order to facilitate the processing of load/store instructions as described above.

The method 500 is initialized at step 502 and proceeds to step 504, where the method 500 identifies the most frequent load/store instructions, as well as the accessed data items corresponding to these load/store instructions.

In step 506, the method 500 calculates the affinity and conflict metrics for each load/store instruction pair. The affinity between two memory reference instructions is defined to be proportional to the cardinality of the common set of data items that are accessed by the two instructions within a given time interval. If two instructions access the same data set, assigning the two instructions to the same partition is useful, as the two instructions can aid each other by pre-fetching data sets for the other. Conflict information is used to identify which pairs of load/store instructions potentially displace each other, and are thus better assigned to different partitions.

In step 508, the method 500 records the footprint of each load/store instruction. The footprint of a load/store instruction is the number of unique reused data items that are accessed by the load/store instruction. Load/store instructions with large footprints may need to be assigned to multiple partitions.

In step 510, each load/store instruction is broken into one or more sub-instructions, where each sub-instruction is either a regular load/store instruction or a sub-part of a single load/store instruction that performs a subset of the data accesses that would have been performed by the original load/store instruction. The number of sub-instructions corresponding to each load/store instruction is proportional to:

Footprint(instruction)/sizeof(single partition)

where Footprint(instruction) is the number of unique reused data items accessed by the corresponding load/store instruction.

In step 512, the method 500 formulates the partitioning problem as a graph, where nodes of the graph correspond to sub-instructions, and edges of the graph measure the desire of the sub-instructions to be assigned to the same or different partitions. The edge weights of the graph are computed based on the affinity and conflict metrics calculated earlier. The edges of the graph are assigned weights such that load/store instructions exhibiting a high degree of conflict are assigned to different partitions, while load/store instructions exhibiting a high degree of affinity are assigned to the same partition. The edge weights between sub-instructions of the same memory reference instruction are set such that the sub-instructions are always assigned to different partitions.

In step 514, the method 500 assigns each load/store instruction to one or more cache partitions, in accordance with the graph. In one embodiment, a load/store instruction is assigned to multiple cache partitions if the load/store instruction comprises multiple sub-instructions assigned to different partitions.

In step 516, the method 500 annotates the load/store instructions with their respective partition identifiers, as determined in step 514. The method 500 then terminates in step 518.

Figure 6:
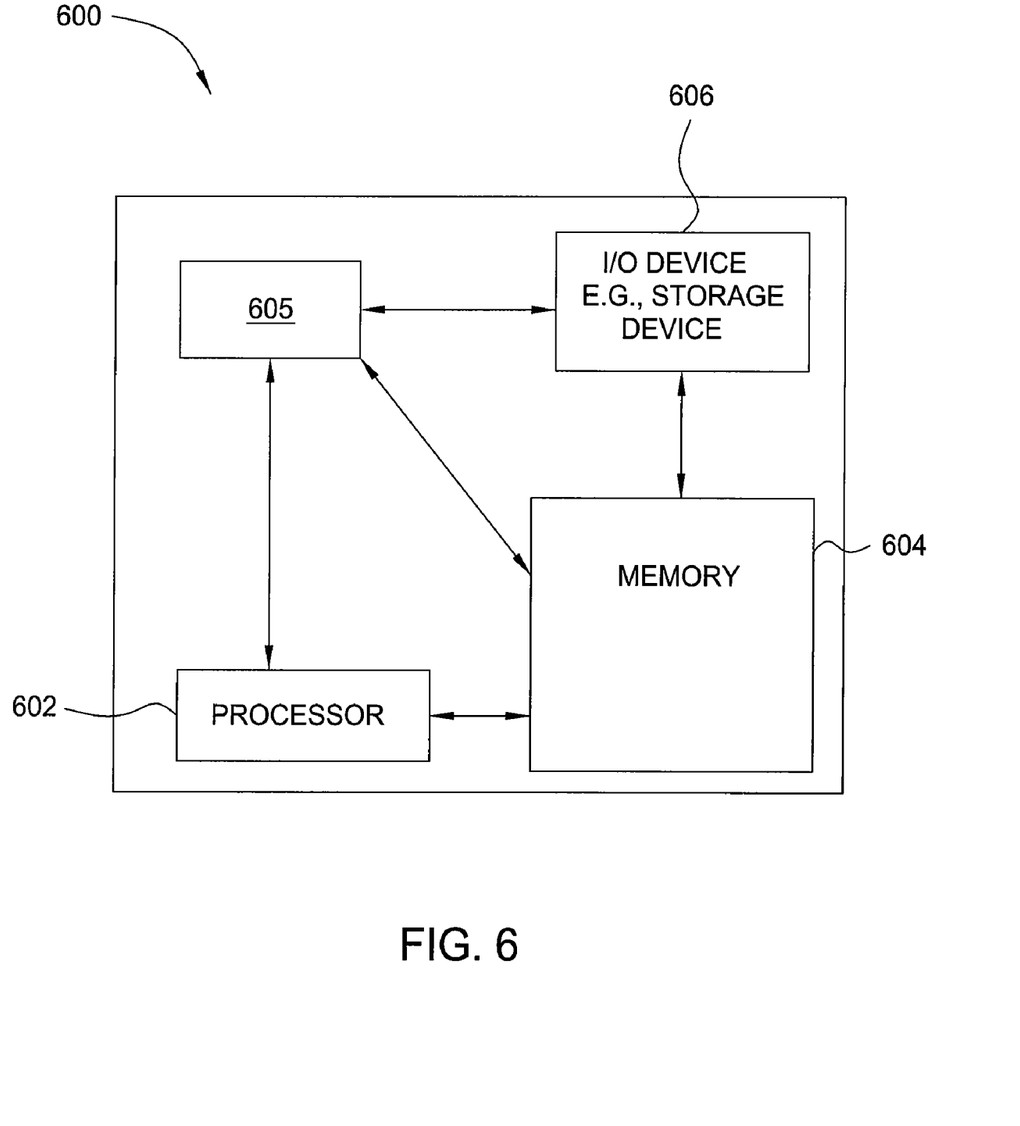
FIG. 6 is a high level block diagram of the data caching method that is implemented using a general purpose computing device.

FIG. 6 is a high level block diagram of the data caching method that is implemented using a general purpose computing device 600. In one embodiment, a general purpose computing device 600 comprises a processor 602, a memory 604, a data caching module 605 and various input/output (I/O) devices 606 such as a display, a keyboard, a mouse, a modem, and the like. In one embodiment, at least one I/O device is a storage device (e.g., a disk drive, an optical disk drive, a floppy disk drive). It should be understood that the data caching module 605 can be implemented as a physical device or subsystem that is coupled to a processor through a communication channel.

Alternatively, the data caching module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the data caching module 605 for loading and storing data described herein with reference to the preceding Figures can be stored on a computer readable medium or carrier (e.g., RAM, magnetic or optical drive or diskette, and the like).

Thus, the present invention represents a significant advancement in the field of data processing systems. Embodiments of the present invention maintain multiple smaller caches, as opposed to a traditional unified cache. That is, the cache is partitioned logically (i.e., without necessarily maintaining multiple distinct caches), such that data items can be assigned separately to each of the partitions, thereby reducing conflicts among data items that may share a set address while residing at different locations within memory. Moreover, data sets with long reuse can be restricted to a certain partition, making it less likely that a data set will replace other, more useful data items assigned to other partitions.

While the foregoing is directed to the preferred embodiment of the present invention, other and further embodiments of the invention may be devised without departing from the basic scope thereof, and the scope thereof is determined by the claims that follow.

The invention claimed is:

1. A method for accessing data in a cache memory system, the method comprising: grouping sets of the data in the cache memory system into two or more virtual partitions, wherein the grouping comprises:
identifying one or more load/store instructions that are encountered most frequently from among a plurality of load/store instructions;
identifying one or more data items in the sets that are accessed by the one or more load/store instructions;
formulating a graph, where each node of the graph corresponds to one of the one or more load/store instructions and each edge of the graph is weighted by an affinity between a pair of the one or more load/store instructions that are connected by the edge, wherein the affinity reflects a degree to which the pair of the one or more load/store instructions access common ones of the one or more data items within a given interval of time;
assigning each of the one or more load/store instructions to at least one of the two or more virtual partitions in accordance with the graph, such that those of the one or more load/store instructions that exhibit a high degree of affinity are assigned to a common one of the two or more virtual partitions;
processing at least one of said one or more load/store instructions in accordance with the two or more virtual partitions, where the at least one of the one or more load/store instructions specifies the at least one of the two or more virtual partitions to which the at least one of the one or more load/store instructions is assigned;
checking at least a subset of the two or more virtual partitions for at least one of the one or more data items that is referenced by at least one of said one or more load/store instructions;
fetching the at least one of the one or more data items from one of the two or more virtual partitions, if the at least one of the one or more data items is located therein and the load/store instruction specifies a load operation;
storing the at least one of the one or more data items in one of the two or more virtual partitions, if the toad/store instruction specifies a store operation; and
loading the at least one of the one or more data items to the at least one of the two or more virtual partitions to which the load/store instruction is assigned, if the at least one of the one or more data items is not located in the subset of the two or more virtual partitions.

2. The method of claim 1, wherein the checking comprises: checking each of the two or more virtual partitions for the at least one of the one or more data items.

3. The method of claim 1, wherein the checking comprises: identifying one or more sets in the cache memory system that comprise the at least one of the two or more virtual partitions to which the at least one of said one or more load/store instructions is assigned; and checking the one or more sets for the at least one of the one or more data items.

4. The method of claim 1, wherein the loading and storing comprises: selecting a virtual partition from among two or more virtual partitions to which the at least one of said one or more load/store instructions is assigned, in accordance with a cache replacement policy.

5. The method of claim 1, wherein the at least one of the two or more virtual partitions to which the at least one of said one or more load/store instructions is assigned is specified by an identifier in the at least one of said one or more load/store instructions.

6. The method of claim 5, wherein the at least one of said one or more load/store instructions comprises a number of extra bits for specifying the identifier.

7. The method of claim 5, wherein the identifier is implemented as a prefix instruction to the at least one of said one or more load/store instructions, the prefix instruction specifying one of the two or more virtual partitions that is associated with a next sequential load/store instruction.

8. The method of claim 5, wherein the identifier is specified in accordance with one or more registers implemented as operands of the at least one of said one or more load/store instructions.

9. The method of claim 1, wherein the formulating the graph comprises:
dividing each of the one or more load/store instructions into one or more sub-instructions, each of the one or more sub-instructions comprising a node of the graph;
calculating the affinity for each pair of load/store instructions within the one or more load/store instructions;
calculating a conflict metric for each pair of load/store instructions within the one or more load/store instructions; and
assigning weights to the each edge of the graph in accordance with the affinity and the conflict metric, the weights indicating whether each pair of load/store instructions within the one or more load/store instructions should be assigned to a common virtual partition or to different virtual partitions.

10. A computer readable medium containing an executable program for accessing data in a cache memory system, where the program performs the steps of:

grouping sets of the data in the cache memory system into two or more virtual partitions, wherein the grouping comprises:

identifying one or more load/store instructions that are encountered most i frequently from among a plurality of load/store instructions;

identifying one or more data items in the sets that are accessed by the one or more load/store instructions;

formulating a graph, where each node of the graph corresponds to one of the one or more load/store instructions and each edge of the graph is weighted by an affinity between a pair of the one or more load/store instructions that are connected by the edge, wherein the affinity reflects a degree to which the pair of the one or more load/store instructions access common ones of the one or more data items within a given interval of time;

assigning each of the one or more load/store instructions to at least one of the two or more virtual partitions in accordance with the graph, such that those of the one or more toad/store instructions that exhibit a high degree of affinity are assigned to a common one of the two or more virtual partitions;

processing at least one of said one or more load/store instructions in accordance with the two or more virtual partitions, where the at least one of the one or more load/store instructions specifies the at least one of the two or more virtual partitions to which the at least one of the one or more load/store instructions is assigned checking at least a subset of the two or more virtual partitions for at least one of the one or more data items that is referenced by at least one of said one or more road/store instructions;

fetching the at least one of the one or more data items from one of the two or more virtual partitions, if the at least one of the one or more data items is located therein and the load/store instruction specifies a load operation;

storing the at least one of the one or more data items in one of the two or more virtual partitions, if the load/store instruction specifies a store operation; and loading the at least one of the one or more data items to the at least one of the two or more virtual partitions to which the load/store instruction is assigned, if the at least one of the one or more data items is not located in the subset of the two or more virtual partitions.

11. The computer readable medium of claim 10, wherein the checking comprises:

checking each of the two or more virtual partitions for the at least one of the one or more data items.

12. The computer readable medium of claim 10, wherein the checking comprises:

identifying one or more sets in the cache memory system that comprise the at feast one of the two or more virtual partitions to which the at least one of said one or more load/store instructions is assigned; and checking the one or more sets for the at least one of the one or more data items.

13. The computer readable medium of claim 10, wherein the at least one of the two or more virtual partitions to which the at least one of said one or more load/store instructions is assigned is specified by an identifier in the at least one of said one or more load/store instructions.

14. The computer readable medium of claim 13, wherein the at least one of said one or more load/store instructions comprises a number of extra bits for specifying the identifier.

15. The computer readable medium of claim 10, wherein the formulating the graph comprises:

dividing each of the one or more load/store instructions into one or more sub-instructions, each of the one or more sub-instructions comprising a node of the graph;

calculating the affinity for each pair of load/store instructions within the one or more load/store instructions;

calculating a conflict metric for each pair of load/store instructions within the one or more load/store instructions; and assigning weights to the each edge of the graph in accordance with the affinity and the conflict metric, the weights indicating whether each pair of load/store instructions within the one or more load/store instructions should be assigned to a common virtual partition or to different virtual partitions.

16. A cache controller for controlling access to a cache memory, the cache controller comprising:

means for grouping sets of the data in the cache memory system into two or more virtual partitions, wherein the means for grouping comprises:

means for identifying one or more load/store instructions that are encountered most frequently from among a plurality of load/store instructions;

means for identifying one or more data items in the sets that are accessed by the one or more load/store instructions;

means for formulating a graph, where each node of the graph corresponds to one of the one or more load/store instructions and each edge of the graph is weighted by an affinity between a pair of the one or more road/store instructions that are connected by the edge, wherein the affinity reflects a degree to which the pair of the one or more load/store instructions access common ones of the one or more data items within a given interval of time;

means for assigning each of the one or more load/store instructions to at least one of the two or more virtual partitions in accordance with the graph, such that those of the one or more load/store instructions that exhibit a high degree of affinity are assigned to a common one of the two or more virtual partitions; and means for processing at least one of said one or more load/store instructions in accordance with the two or more virtual partitions, where the at least one of the one or more load/store instructions specifies the at least one of the two or more virtual partitions to which the at least one of the one or more load/store instructions is assigned;

means for checking at least a subset of the two or more virtual partitions for at least one of the one or more data items that is referenced by at least one of said one or more load/store instructions;

means for fetching the at least one of the one or more data items from one of the two or more virtual partitions, if the at least one of the one or more data items is located therein and the load/store instruction specifies a load operation;

means for storing the at least one of the one or more data items in one of the two or more virtual partitions, if the toad/store instruction specifies a store operation; and means for loading the at least one of the one or more data items to the at least one of the two or more virtual partitions to which the load/store instruction is assigned, if the at feast one of the one or more data items is not located in the subset of the two or more virtual partitions.

* * * * *